(12) United States Patent
Hsieh

(10) Patent No.: US 6,860,627 B2
(45) Date of Patent: Mar. 1, 2005

(54) SPECIAL-PURPOSE LIGHT-GUIDING SEAT FOR PILOT LAMPS OF AN ELECTRONIC MACHINE

(75) Inventor: Hiu-Lan Hsieh, Taipei (TW)

(73) Assignee: Taiwan Tri Gem Information Co., Ltd., Taipei (TW)

( * ) Notice: Subject to any disclaimer, the term of this patent is extended or adjusted under 35 U.S.C. 154(b) by 158 days.

(21) Appl. No.: 10/277,456

(22) Filed: Oct. 22, 2002

(65) Prior Publication Data

US 2004/0076020 A1 Apr. 22, 2004

(51) Int. Cl.$^7$ .............................. F21V 7/04; G02B 6/00; G09F 13/00
(52) U.S. Cl. ..................... 362/551; 362/555; 362/581; 362/268; 362/311; 362/331; 362/800
(58) Field of Search ................................. 362/551, 555, 362/31, 559, 577, 581, 268, 311, 331, 800, 27, 89; 385/901, 902

(56) References Cited

U.S. PATENT DOCUMENTS 5,515,244 A * 5/1996 Levins et al. ................ 362/551
6,574,414 B2 * 6/2003 Schechtel et al. ........... 385/146

* cited by examiner

Primary Examiner—Stephen Husar
Assistant Examiner—Sharon Payne

(57) ABSTRACT

A special-purpose light-guiding seat for pilot lamps of an electronic machine, which comprises a fixing base, a light-guiding device, and a light-pervious block, is basically mounted on an electronic machine housing for indicating the state of inside light sources (LED), in which the light-guiding device is substantially a transparent rod body having its front end connected with the light-pervious block while its tail end is extended to approach the light source; and the lightpervious block is jointed with the fixing base such that the outer-edge surface of the light-pervious block can be inserted and fixed flush on the machine housing for people to view from outside the lighting state of the light-pervious block easily and distinctly.

3 Claims, 5 Drawing Sheets

SPECIAL-PURPOSE LIGHT-GUIDING SEAT FOR PILOT LAMPS OF AN ELECTRONIC MACHINE

FIELD OF THE INVENTION

The present invention relates generally to a light-guiding seat, and in particular to a special-purpose light-guiding seat for pilot lamps of an electronic machine.

BACKGROUND OF THE INVENTION

A light-emitting diode (LED) could be detached from an inside PC board and extended to be installed on the housing of an electronic machine for showing the lighting state of the LED. However, such an activity is too tedious and lack of stability for a person to perform. Instead, a widely adopted approach is to move the LED together with a PC board as closer as possible to a predetermined through hole in the machine housing for showing its lighting state clearly through a light-pervious block. This approach is established on the premise of a shortest clearance between the LED and the light-pervious block. It results in difficult conditions in the arrangement of the PC board and the light source and the available space between them. Moreover, cross interference of neighboring light-pervious blocks might be incurred to confuse people with the lighting state of the light-pervious blocks that needs to be distinctly isolated.

SUMMARY OF THE INVENTION

The primary objective of this invention is to provide a special-purpose light-guiding seat for pilot lamps of an electronic machine having the following merits:

1. The state of an inside light source can be shown clearly in a light-pervious block;
2. The light of a remote light source can be converged and transmitted to a light-pervious block via a light-guiding device to simplify design of a substrate and the machine housing and enlarge the space thereof; and
3. The light transmitted from a remote light source to a light-pervious block on the machine housing wouldn't be attenuated significantly.

In order to obtain these merits, the light-guiding device is adopted to converge and transmit light to the outside of the machine housing to thereby simplify the assembly of light sources. A special-purpose light-guiding seat for pilot lamps of an electronic machine, comprised of a fixing base, a light-guiding device, and a light-pervious block, is basically mounted on the machine housing for indicating the state of inside light sources (LED), in which the light-guiding device is substantially a transparent rod body having its front end connected with the light-pervious block while its tail end is extended to approach the light source; and the light-pervious block is jointed with the fixing base in such a way that the outer-edge surface of the light-pervious block can be inserted and fixed flush on the machine housing for people to view from outside the lighting state of the light-pervious block easily and distinctly.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
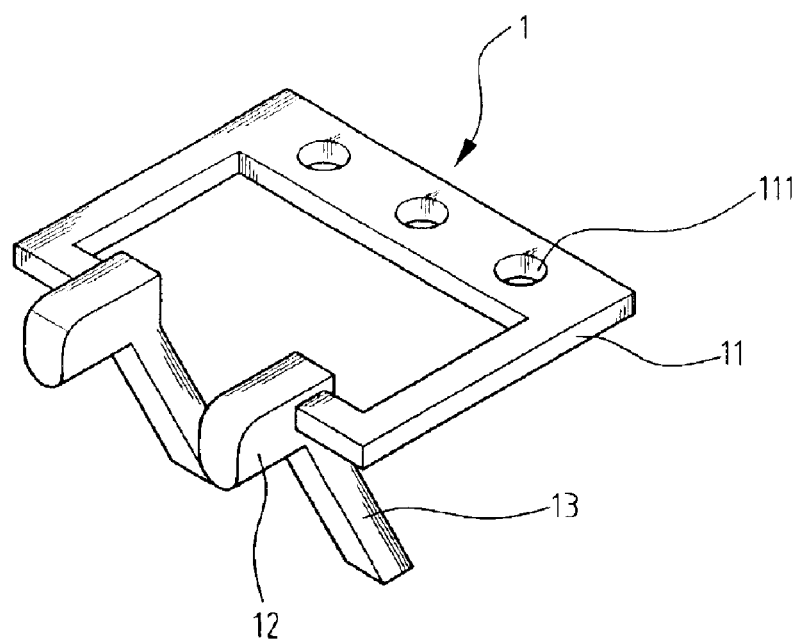
FIG. 1 is a three-dimensional view of an embodiment of this invention.
Figure 2:
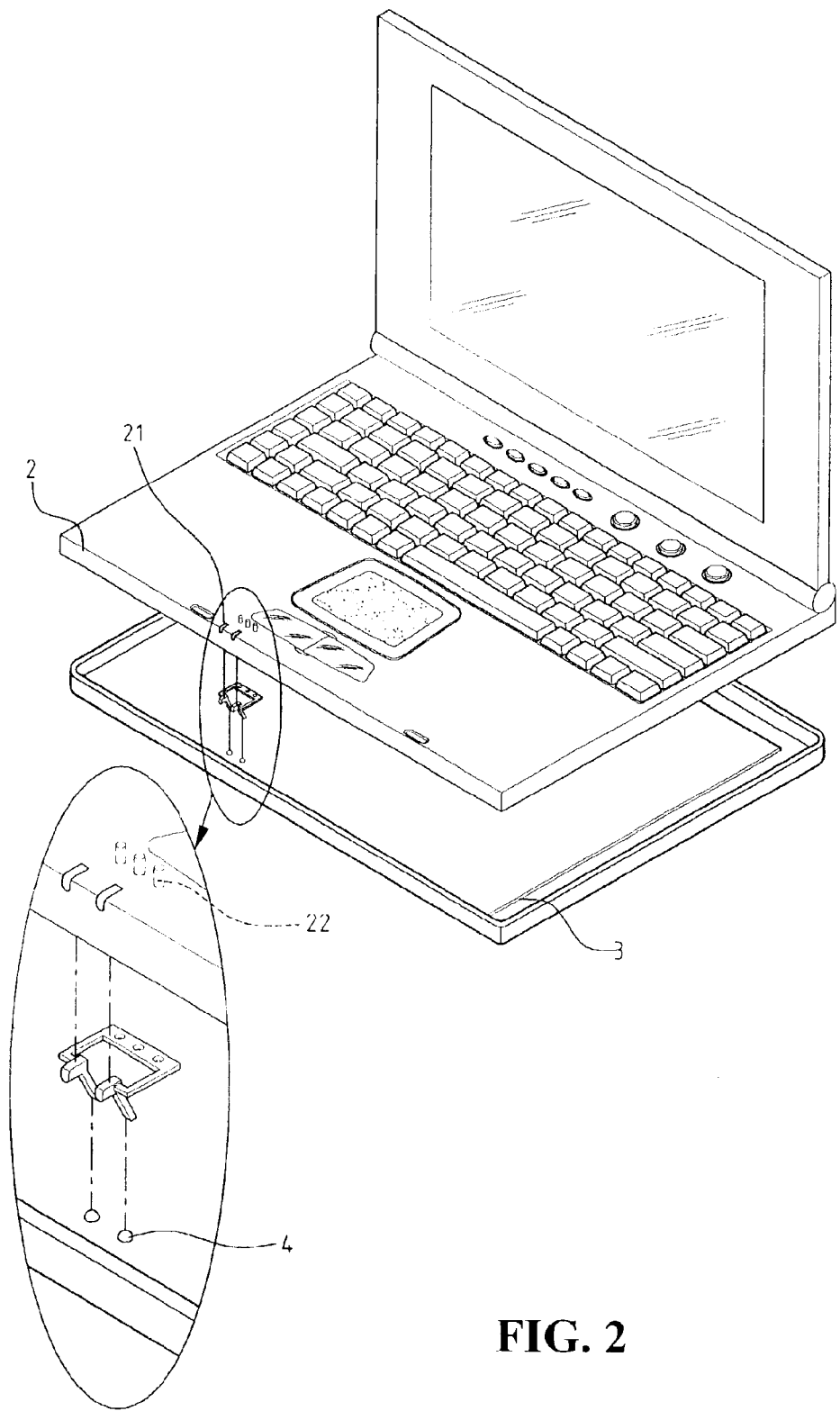
FIG. 2 shows an assembly embodiment (I) of this invention.

FIG. 1 is a three-dimensional view of an embodiment of this invention showing a special-purpose light-guiding seat 1 for pilot lamps of an electronic machine at a proper position for guiding the light emanated by inside light sources (usually LEDs) 4 and showing it on a machine housing 2 as illustrated in FIG. 2.

The light-guiding seat 1 is made of a transparent material integrally and mainly comprised of a U-shaped fixing base 11, a light-guiding device 13, and a light-pervious block 12, in which the light-guiding device 13 is substantially a transparent rod body having its front end connected with the light-pervious block 12 while its tail end is extended to approach the light source 4; and the light-pervious block 12 is jointed with the two arms of the fixing base 11 in such a way that the outer-edge surface of the light-pervious block 12 can be flush inserted on the machine housing 2 for people to view externally the lighting state of the light-pervious block 12. Besides, the fixing base 11 is fixedly located at a suitable position directly on the machine housing or on some other component or device inside the machine housing 2. When a remote light source (LED) 4 is lightened, light emitted is converged to the light-pervious block 12 via the transparent light-guiding device 13 to thereby transfer the light from the light source effectively.

Figure 3:
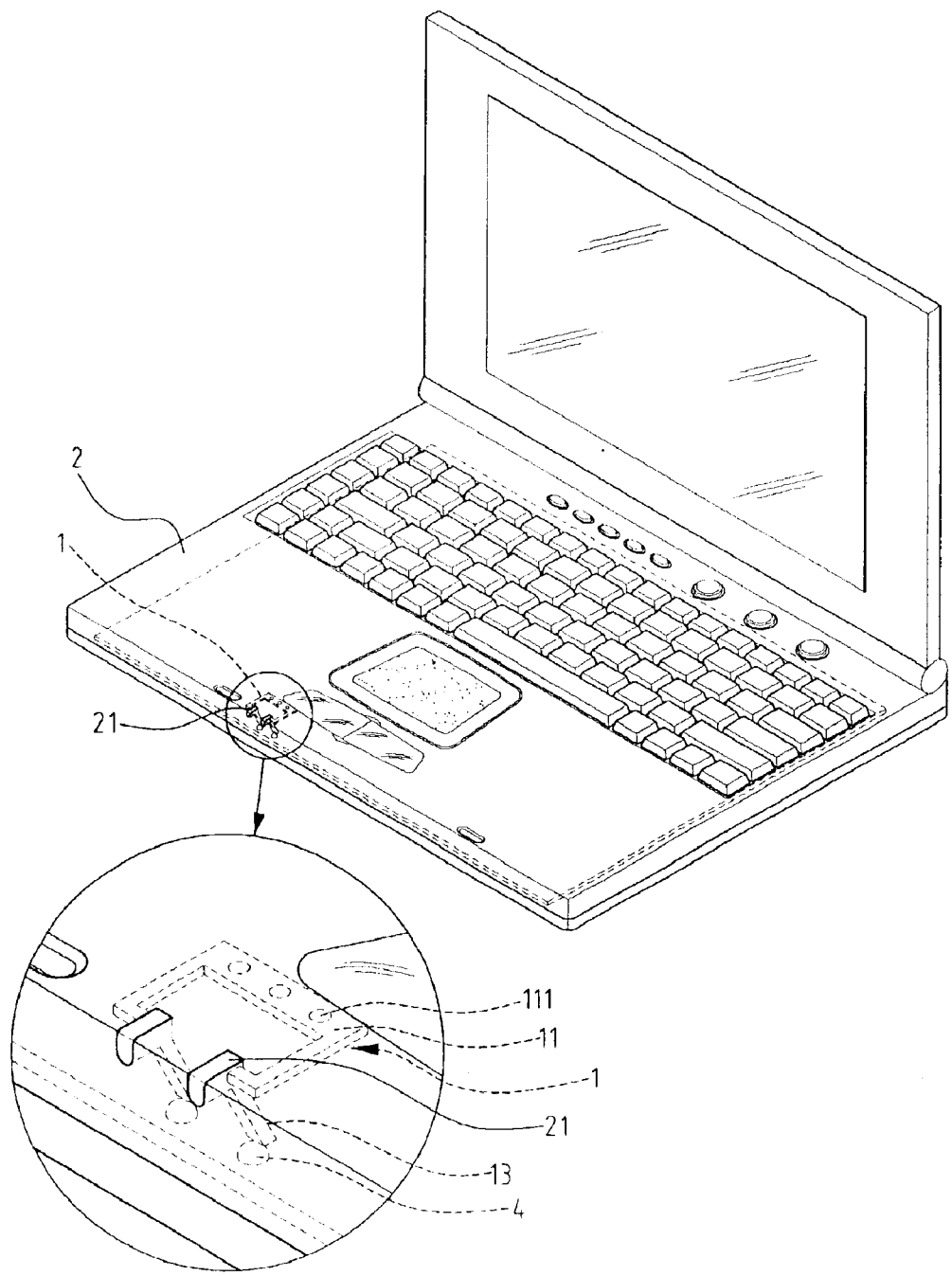
FIG. 3 shows an assembly embodiment (II) of this invention.

According to the respective assembly embodiments (I) and (II) of this invention shown in FIGS. 2 and 3, a special-purpose light-guiding seat for pilot lamps of an electronic machine is constructed by arranging a plurality of light-pervious blocks 12 and light-guiding devices 13 on a fixing base 11. The properties of the light-pervious block 12 and the light guiding device 13 are similar and depending on the type of a light source 4, and both the light-pervious block 12 and the light-guiding device 13 are made of a transparent material. Moreover, the light-guiding device 13 could be a rod body having its front end connected with the light-pervious block 12 while its tail end is extended to approach the light source 4. Also, the light-guiding device 13 and the light-pervious block 12 are fixed together at a suitable position inside the machine housing 2 in such a way that the light-pervious block 12 can be snap-retained in a through hole 21 of the machine housing 2 so that the surface of the light-pervious block 12 is flush with or protrusive from that of the machine housing 2. When the remote light source 4 is lightened, the light is transmitted to and shown in the light-pervious block 12 through the light-guiding device 13. The fixing base 11 could be bar-shaped and provided with several through holes 111 through which the fixing base 11 can be connected to some fixing members 22 on the machine housing 2 by way of fusion connection or screwing such as the example shown in FIG. 4.

Figure 4:
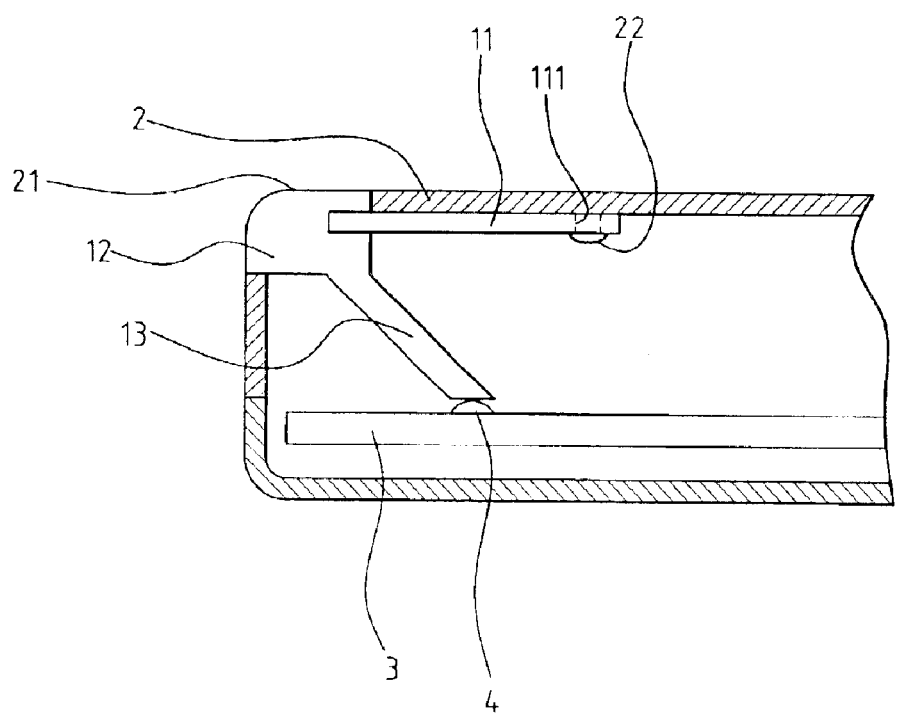
FIG. 4 is a schematic cutaway sectional view (I) of this invention.
Figure 5:
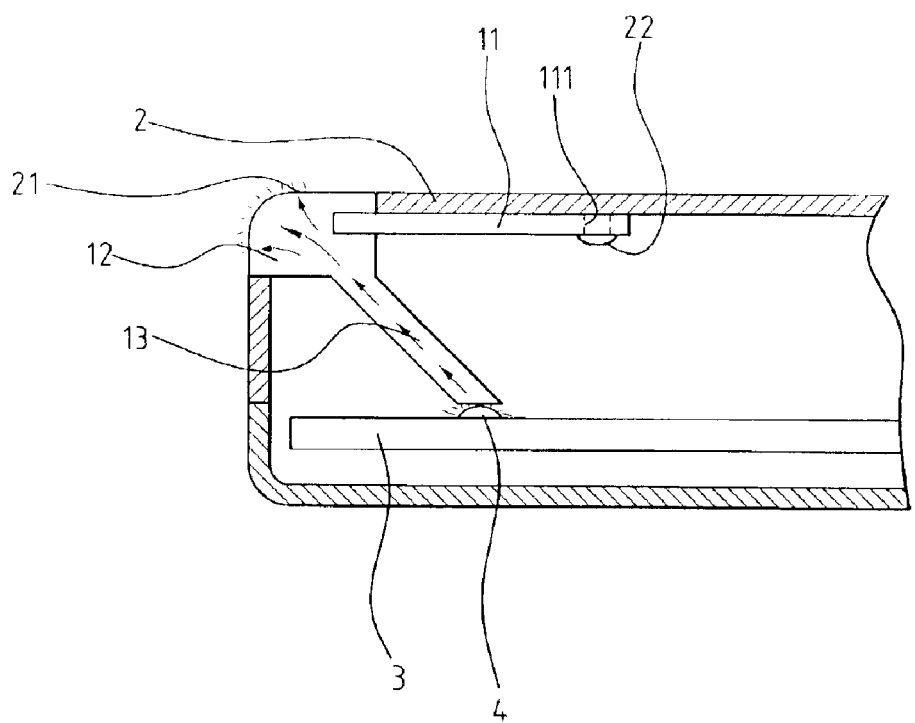
FIG. 5 is a schematic cutaway sectional view (II) of this invention.

According to the respective cutaway sectional views (I) and (II) of this invention shown in FIGS. 4 and 5, front end of the light-guiding device 13 is jointed with the light-guiding block 12, and its tail end is arranged approaching a light source 4 on a substrate 3. When the light source 4 is lightened, the light is transmitted to and shown in the light-pervious block 12 through the light-guiding device 13, and meanwhile, because the surface of the light-pervious block 12 is protruded in air over the machine housing 2, the light shown in the light-pervious block 12 can be viewed by people.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A light-guiding seat for pilot lamps of an electronic machine, comprising:

a U-shaped fixing base having two arms;

a pair of light-pervious blocks each being jointed with an arm of said U-shaped fixing base;

a pair of light-guiding devices each having a first end connected with one of said light-pervious blocks and a second end; and a pair of light sources each being positioned below the second end of one of said light-guiding devices;

wherein each of said pair of light-pervious blocks is snapped into a through hole of a housing of said electronic machine to be flush with or protrusive from said housing when said U-shaped fixing base is affixed directly on said housing.

2. The light-guiding seat for pilot lamps of an electronic machine as claimed in claim 1, wherein each of said pair of light-guiding devices is a rod body.

3. The light-guiding seat for pilot lamps of an electronic machine as claimed in claim 1, wherein said U-shaped fixing base further comprises a plurality of through holes for mounting said U-shaped fixing base to said housing.

* * * * *